Figure 1:
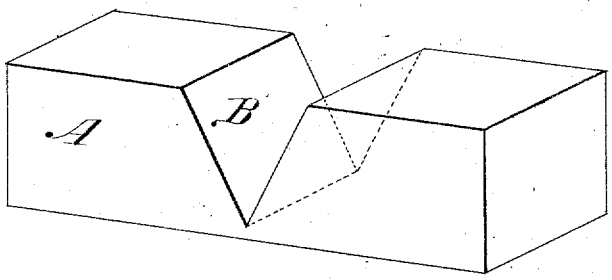

W. B. HOWE.

PACKAGE FOR SHIPPING CANDY STICKS.

No. 9,942. Reissued Nov. 22, 1881.

WITNESSES —
Wm. Whiting
James H. Coyne

INVENTOR —
Warren B. Howe
By Coyne and Elliot
Attys

UNITED STATES PATENT OFFICE.

WARREN B. HOWE, OF CHICAGO, ILLINOIS.

PACKAGE FOR SHIPPING CANDY STICKS.

SPECIFICATION forming part of Reissued Letters Patent No. 9,912, dated November 22, 1881.

Original No. 230,778, dated August 3, 1880. Application for reissue filed July 2, 1881

*To all whom it may concern:*

Be it known that I, WARREN B. HOWE, a citizen of the United States, residing in Chicago, in the county of Cook and State of Illinois, have invented an Improvement in Packages for Shipping Candy Sticks and in the Methods of Forming the Same, of which the following is a specification.

My invention relates to certain improvements in packages adapted especially to the shipment of stick-candy.

The invention consists of a packet substantially triangular or prismatic in form, said packet, as hereinafter set forth, being made up of a number of candy sticks held within a retaining envelope or wrapper, the particular shape given the packets being that which permits of arranging them within a shipping-case—such, for example, as a barrel, cask, tub, or bucket—of approximately cylindrical form, with maximum economy of space and least danger of breakage, and ultimately of an article of merchandise consisting of an approximately cylindrical shipping-case containing a sufficient number of these packets, in one or more layers, to economize all the available space.

Prior to my invention the shipping-cases above named best adapted to the transportation of fragile materials, because not roughly handled like the ordinary box in transit, and also desirable as shipping-cases because they have a merchantable value in themselves, could not be used to advantage for shipping stick-candy. Packets of the ordinary shape arranged within the cylindrical case left spaces unfilled, so that when the case was handled the sticks of candy next against these spaces were subject to constant strain and tendency to fracture, a result, once reached, destroying the value of the candy sticks. By my invention these spaces no longer exist, contiguous packets, by reason of their particular shape, resting close against each other and against the walls of the case substantially over their entire surface, so that they mutually brace each other and form practically a compact unyielding package. Certain improvements in the manner of folding the wrapper or envelope upon the pile of candy sticks, which are hereinafter described, still further assist in bracing or cushioning the packets at those portions most exposed to fracture, and as well act to exclude the dampness, dust, &c., from the contents of the packets.

To fully comprehend the merits of my invention, it must be borne in mind that candy sticks are smooth, unyielding, brittle, and easily broken when subject to any considerable pressure, or to sudden jars or very slight blows; that each stick is a straight cylinder, and has a uniform diameter throughout its length, though this diameter may vary in independent sticks, and that every stick is substantially of the same length.

Figure 2:
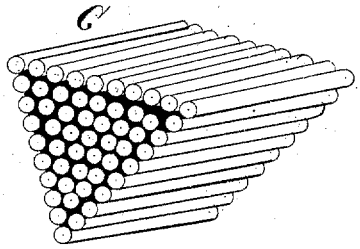
Figure 3:
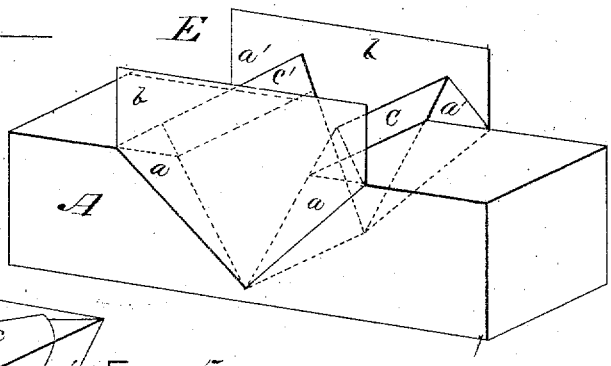
Figure 4:
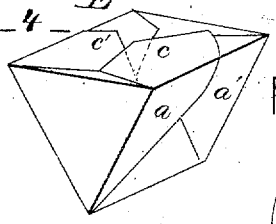

In the accompanying drawings, Figure 1 is a perspective view of a die or former in which the wrapper and candy sticks are placed to make up a packet. Fig. 2 is a perspective view, showing the arrangement of the candy sticks, the wrapper being removed. Fig. 3 is a perspective view of the die or former with the wrapper resting therein and at that stage when said wrapper and its contents are to be raised above the recess in the former to fold the side flaps of the wrapper down upon the inclined faces of the packet. Fig. 4 is a perspective view of a complete packet; and Fig. 5, a plan view of a cylindrical receptacle or shipping-case, with a layer of the packets arranged therein to form the completed article of merchandise.

Similar letters of reference indicate corresponding parts.

A represents a block provided with a transverse recess, B, extending from side to side of the block, V-shaped in cross-section, as clearly shown in Fig. 1.

C represents the sticks of candy arranged to form a packet, with the wrapper removed, as shown in Fig. 2.

E represents the wrapper, as shown in Figs. 3 and 4.

Figure 5:
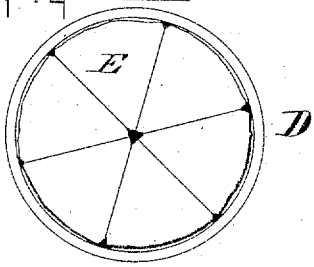

In carrying out my invention the wrapper E should be first placed and pressed down into the die or former to conform the wrapper as near as possible to the shape thereof, after which sticks of candy are laid in sufficient to make up the packet, and which, as finished, will, with the folds of the wrapper, conform approximately on its upper face to the contiguous walls of the shipping-case next against which it is packed, as shown in Fig. 5. After truing the ends of the sticks, either by direct contact of the hand or by placing the hands under the side projections of the wrapper and pressing the wrapper against the ends of the sticks, the wrapper is creased against the sides of the former to form flaps *a a* and *a′ a′* at each corner of the packet. When these flaps are once formed the projecting ends *b b* (see Fig. 3) are folded down upon the top of the candy. The palms of the hands of the operator are placed one against each side of the wrapper, and, pressing the same against the ends of the sticks, the wrapper, with its contents, is raised above the recess, and the flaps are folded by the fingers of the operator, one upon the other, on the inclined sides of the packet, as shown in Fig. 4—that is to say, the flaps *a′ a′* are first folded around on the inclined sides of the packet, and the flaps *a a* are then folded upon them. Folding the wrapper in this manner thickens the wrapper toward the ends of the packet threefold, and where the flaps overlap fivefold, forming, when the packets are placed in the receptacle, a cushion between each packet of a layer. Said cushion, having a greater thickness where the bulk or heavier portions of the packet are in contact, effectually prevents the effects of sudden jars or blows and consequent breaking of wrapper and contents. To complete the folding of the wrapper the projecting sides *c* and *c′* are folded down upon the base of the packet, as shown in Fig. 4, the several thicknesses of the wrapper at this point forming cushions between the packet and receptacle when packed to protect the contents of the wrapper from the effects of sudden or violent shock or blows while in transit.

The wrapper may be folded in any suitable manner to form a neat and compact packet in outline; and, although I deem the manner described preferable, it is not essential, for the ultimate and main object in forming these packets is to arrange and maintain a series of candy sticks in a triangular or prismatic packet—that is to say, a packet having vertical ends and converging sides—so that a number of these packets may be packed with great economy of space in one or more layers in a cylindrical shipping-case.

In Fig. 5 is illustrated the packing of the packets in a cylindrical receptacle, which may be a tub, barrel, or bucket suitable for a shipping-case, the packets being laid side by side, so that their converging sides are contiguous to each other, tapering toward the center of the receptacle, and the base of the packets resting against the sides of the receptacle, and in the present instance six of them sufficing to completely fill the available space; but, of course, the size of the packets may be increased or diminished, according to the convergence of their sides, and the number of packets required to fill a receptacle will be accordingly increased or diminished.

I do not herein claim the wrapper or envelope shown, because I propose to claim it in a separate application.

Having thus fully described my invention, what I claim, and desire to secure by Letters Patent, is—

1. A packet substantially wedge-shaped or prismatic in form, consisting of a series of candy sticks contained within an envelope or wrapper folded substantially as described, so as to secure and maintain the packet in said form.

2. The combination, with an approximately cylindrical shipping-case, of triangular or prismatic-like packets—that is to say, packets having vertical ends and converging sides—consisting of a series of candy sticks contained within an envelope or wrapper folded substantially as described, so as to secure and maintain the packets in said form.

3. The combination, with a shipping-case substantially cylindrical in form, of wedge-shape or prismatic-like packets consisting of a series of candy sticks retained, as described, within an envelope or wrapper, said wrapper being provided with overlapping folds or flaps to guard the base and inclined sides of the packets.

4. A packet substantially wedge-shaped or prismatic in form, consisting of a series of candy sticks contained within an envelope or wrapper folded substantially as described, so as to secure and maintain the packet in said form, and provided with overlapping folds or flaps to guard the base and inclined sides of the packet.

5. The herein-described method of forming a wedge or prismatic like packet of candy sticks, consisting in first placing the wrapper in a V-shaped die, then filling the wrapper with candy sticks laid parallel to each other until their bulk attains approximately the shape of said die, and finally closing the wrapper upon the same, substantially as described.

6. The herein-described method of forming a triangular or prismatic-like packet of candy sticks, consisting in first placing the wrapper in a V-shaped die, then filling the wrapper with candy sticks laid parallel to each other until their bulk attains approximately the shape of the die, then creasing the wrapper against the sides of the die, then folding the projecting ends upon die and contents, and afterward folding the corner-flaps upon the inclined sides of the packet, and finally folding the projecting sides down upon the top of the packet to close it, substantially as described and shown.

WARREN B. HOWE.

Witnesses:
JNO. G. ELLIOTT,
WM. C. WHITING.